(12) United States Patent
Baumbach et al.

(10) Patent No.: US 11,132,052 B2
(45) Date of Patent: Sep. 28, 2021

(54) SYSTEM FOR GENERATING CUES IN AN AUGMENTED REALITY ENVIRONMENT

(71) Applicant: Disney Enterprises, Inc., Burbank, CA (US)

(72) Inventors: Elliott Baumbach, Porter Ranch, CA (US); Timothy Panec, Studio City, CA (US); Nathan Nocon, Valencia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 11 days.

(21) Appl. No.: 16/517,398

(22) Filed: Jul. 19, 2019

(65) Prior Publication Data

US 2021/0018977 A1 Jan. 21, 2021

(51) Int. Cl.
*G06F 3/01* (2006.01)
*G02B 27/01* (2006.01)
*G06T 19/00* (2011.01)

(52) U.S. Cl.
CPC .......... *G06F 3/011* (2013.01); *G02B 27/0172* (2013.01); *G06F 3/017* (2013.01); *G06T 19/006* (2013.01); *G02B 2027/0178* (2013.01)

(58) Field of Classification Search
CPC .......... G06F 3/011; G06F 3/014; G06F 3/017; G06F 3/033; G06F 3/0346; G02B 27/017–0176; G02B 2027/0174–0178; G02B 27/01; G06T 19/006; A63F 2300/8082; H04N 13/344; G06K 9/00671; A61B 2090/365
See application file for complete search history.

(56) References Cited

U.S. PATENT DOCUMENTS

| | | | |
|---|---|---|---|
| 2012/0194554 A1* | 8/2012 | Kaino | G08B 13/19613 345/633 |
| 2013/0328928 A1* | 12/2013 | Yamagishi | G06F 3/011 345/633 |
| 2013/0335301 A1* | 12/2013 | Wong | G06F 3/013 345/8 |
| 2014/0240351 A1* | 8/2014 | Scavezze | G06F 3/011 345/633 |
| 2015/0094142 A1* | 4/2015 | Stafford | A63F 13/211 463/31 |
| 2016/0025982 A1* | 1/2016 | Sutherland | G02B 27/0172 359/13 |
| 2016/0313790 A1* | 10/2016 | Clement | G06F 3/011 |
| 2017/0205892 A1* | 7/2017 | Petrovskaya | G06T 17/20 |
| 2018/0190022 A1* | 7/2018 | Zamir | G06T 19/006 |
| 2018/0190027 A1* | 7/2018 | Yao | G06F 3/011 |
| 2019/0018567 A1* | 1/2019 | Murphy | G06F 3/04883 |
| 2019/0041651 A1* | 2/2019 | Kiemele | G06F 3/011 |

* cited by examiner

*Primary Examiner* — David S Posigian
(74) *Attorney, Agent, or Firm* — Esplin & Associates, PC

(57) ABSTRACT

A system has an augmented reality device accessory that interacts with a virtual element in an augmented reality experience. Further, the system has an augmented reality device that that renders a virtual element that overlays a real-world element in the augmented reality experience. The augmented reality device also determines that the augmented reality device accessory meets one or more mobility criteria with respect to the virtual element. Further, the augmented reality device adjusts the rendering of the virtual element to increase visibility of the real-world element based on the one or more mobility criteria being met.

21 Claims, 18 Drawing Sheets

SYSTEM FOR GENERATING CUES IN AN AUGMENTED REALITY ENVIRONMENT

BACKGROUND

1. Field

This disclosure generally relates to the field of augmented reality ("AR"), often referred to as mixed reality ("MR") when an experience is provided via a head-mounted display ("HMD") device.

2. General Background

AR devices (e.g., HMDs, AR glasses, etc.) are being used more often in environments in which a user is mobile. As an example, AR has been used to provide users with gaming experiences that involve a real-world environment and an overlay of various virtual elements (e.g., imagery, text, etc.) with which a user of the AR device may interact as part of a game.

As users immerse themselves in such experiences, they may lose the ability to distinguish between the virtual and the real world, and they have natural tendencies to test the limits of the virtual elements. For example, such users may attempt to grab at empty space at which a virtual object is located within the AR environment; yet, such empty space may actually correspond to a real-world object that may pose a safety concern to the user if the user were to interact with the virtual object. Virtual objects placed at boundaries of an AR environment may present particular safety concerns if the user attempts to go beyond such boundaries.

Further, users often do not want to have their AR experiences disrupted as a result of such safety concerns, as that may significantly interfere with the enjoyment of the AR experience. Accordingly, conventional systems do not adequately provide an AR experience that both reduces safety concerns and minimizes unwanted disruptions.

SUMMARY

In one aspect, a system is provided. The system has an AR device accessory that interacts with a virtual element in an AR experience. Further, the system has an AR device that renders the virtual element to overlay a real-world element in the AR experience. The AR device also determines that the AR device accessory meets one or more mobility criteria with respect to the virtual element. Further, the AR device adjusts the rendering of the virtual element to increase visibility of the real-world element based on the one or more mobility criteria being met.

In another aspect, a process is provided to perform the functionality of the system. In yet another aspect, a non-transitory computer readable storage device has a computer readable program stored thereon that executes the process.

BRIEF DESCRIPTION OF THE DRAWINGS

The above-mentioned features of the present disclosure will become more apparent with reference to the following description taken in conjunction with the accompanying drawings, wherein like reference numerals denote like elements and in which.

DETAILED DESCRIPTION

A system is provided for generating cues in an AR environment to alert a user of a potential interaction with a virtual element in the AR environment that lacks compliance with one or more criteria. The cues may include a variety of visual features (e.g., fading out of certain virtual elements to increase visibility of underlying real-world elements, emitting visible light on certain virtual elements, etc.) that alert the user to the potential interaction. As an example, the system may generate the cue because of safety concerns. As another example, the system may generate the cue to inform the user of a priority level for a given virtual element or virtual scene (e.g., the user may have already been to that scene).

Although specific examples and illustrations are provided herein with respect to the use of the foregoing system in an AR environment, certain embodiments may also be used in conjunction with a virtual reality ("VR") environment. For example, visible light may be emitted on a virtual element displayed within an AR environment or a VR environment to alert the user to a potential interaction.

The cues provided herein may be used as a safety alert for potential collision detection, but also may be used for other purposes. For example, a cue may be used to indicate a potential interaction between a user and a virtual object that is not positioned at the boundary of an AR/VR environment. For instance, the cue may be used to prompt the user to interact with the virtual element to obtain a prize, generate a virtual interactive effect, change the decor of the AR/VR environment, etc. In other words, the system may fade out one virtual image to display another possible virtual image, or real-world image, if the user completes the user interaction. Alternatively, the cue may be used to provide a message to the user that appears clearer once the user meets the criteria for the potential interaction; such message may be from another user in a multi-user environment, from the system, etc. Accordingly, the cues provided herein may be used by single-user, or multi-user, AR/VR environments in a variety of ways to prompt user action and/or notify the user of an event (e.g., social networking, system event, etc.).

Figure 1:
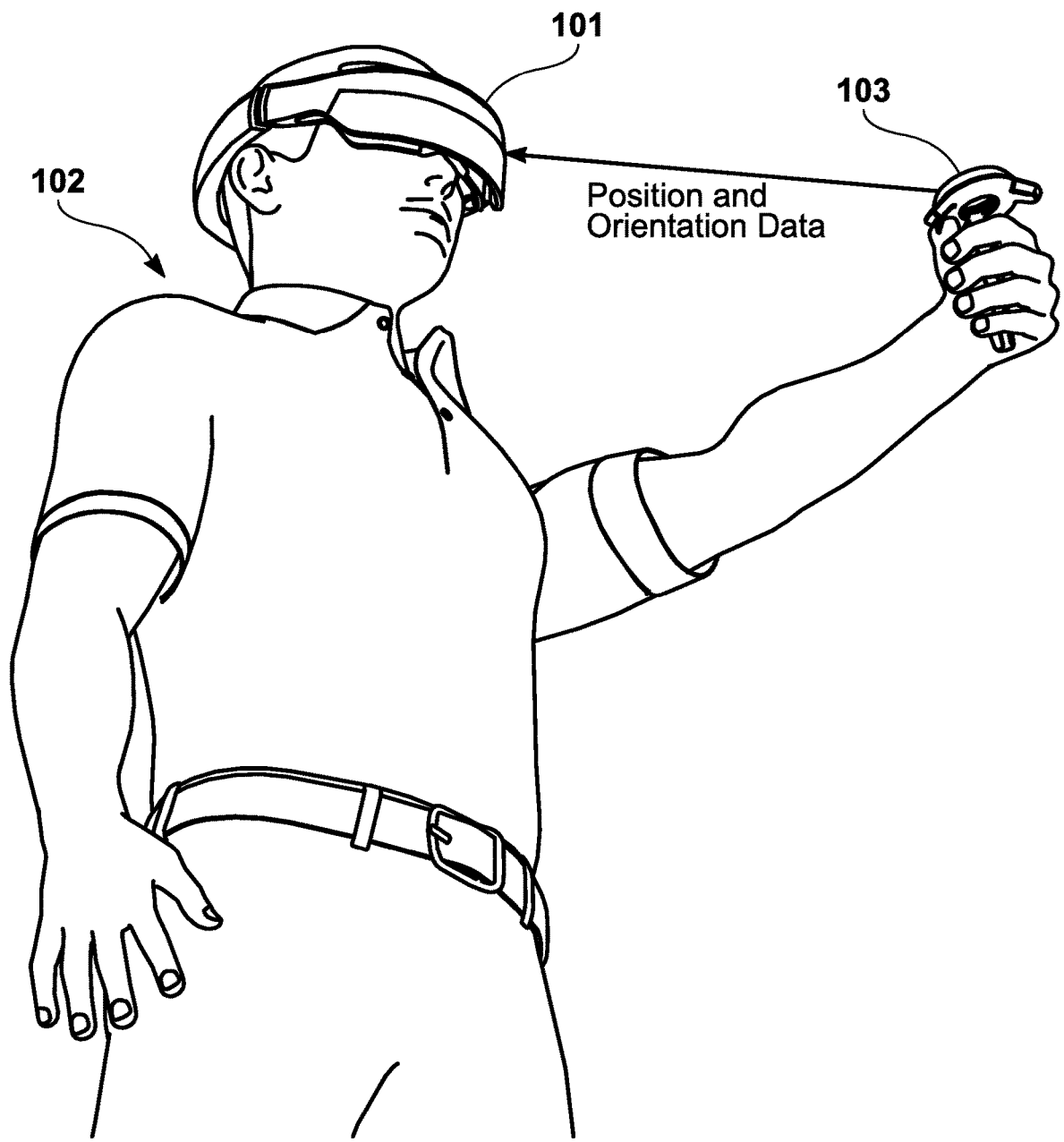
FIG. 1 illustrates an AR device used by a user.

FIG. 1 illustrates an AR device 101 (e.g., HMD) used by a user 102. The AR device 101 allows the user 102 to be immersed in an AR environment in which he or she may view real-world imagery with an overlay of virtual elements. The AR device 101 communicates with an AR device accessory 103 (e.g., hand controller) to effectuate interaction between the user 102 and the virtual elements.

For instance, the user 102, who is a participant in an AR experience, may wear or hold the AR device 101. Further, the user 102 may wear or hold the AR device accessory 103. In one embodiment, the AR device 101 may determine the position and/or orientation of the AR device accessory 103 by tracking the AR device accessory 103 via one or more image capture devices integrated within the AR device 101. (Various tracking processes (e.g., light blob detection, glyph recognition, 3D image recognition, marker tracking, etc.) may be used by the AR device 101 to track the AR device accessory 103.) In another embodiment, the AR device accessory 103 may send, via wireless or wired communication, position and/or orientation data to the AR device 101. (The AR device accessory 103 may use various inertial measurements units ("IMU") (e.g., accelerometers, gyroscopes, and magnetometers) to measure orientation data (e.g., pitch, roll, and/or yaw) of the AR device accessory 103.) By way of the AR device accessory 103, the AR device 101 may determine if, and how, the user 102 is interacting with virtual objects (e.g., via touch) within the AR experience.

Figure 2:
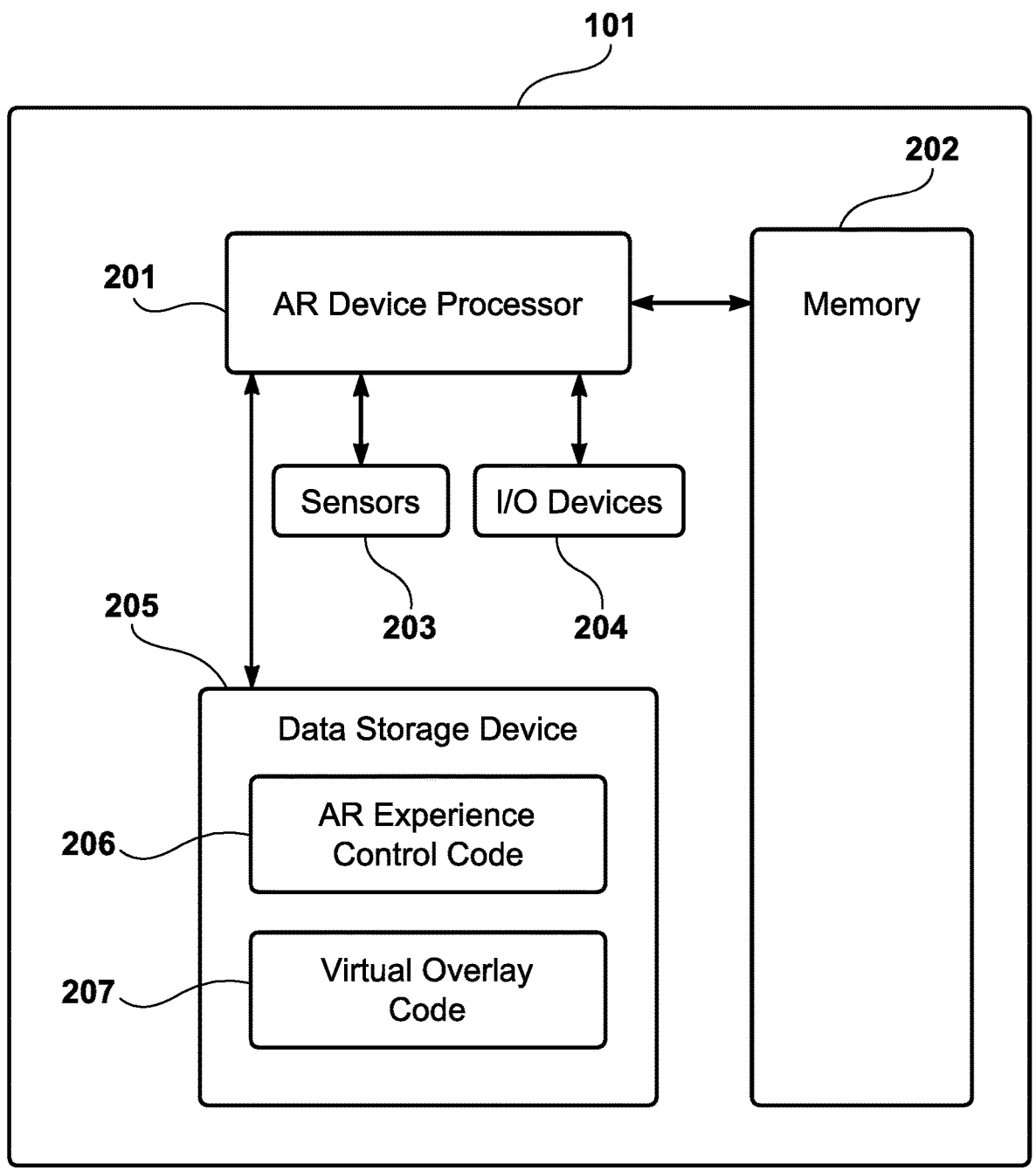
FIG. 2 illustrates a system configuration for the AR device illustrated in FIG. 1.

FIG. 2 illustrates a system configuration for the AR device 101 illustrated in FIG. 1. The internal components of the AR device 101 include an AR device processor 201, which may be specialized for generating an AR experience. For example, the AR device processor 201 may be capable of operating an AR game. In other words, the AR device processor 201, alone or in conjunction with additional processors, has the computational capability to detect head movement of the user 102 and interaction of the user 102 with various virtual elements detected by one or more sensors 203 (e.g., image capture devices); as a result, the AR device processor 201 is capable of generating commands for displaying the virtual elements as AR overlay data based on sensed data, via the one or more sensors 203, or based on inputted/outputted data received via one or more input/output ("I/O") devices 204 (e.g., buttons, dials, microphones, etc.).

The AR device 101 may also include a memory device 202, which may temporarily store computer readable instructions performed by the AR device processor 201. As an example of such computer readable instructions, a data storage device 205 within the AR device 101 may store AR experience control code 206 and virtual overlay code 207. The AR device processor 201 may execute the AR experience control code 206 to control the AR experience. For example, the AR device processor 201 may determine when particular virtual elements should, or should not, appear within the AR experience based on the occurrence of one or more events within the AR experience (e.g., user interaction with virtual elements), as provided for by the AR experience control code 206. Further, the AR device processor 201 may execute the virtual overlay code 207 to generate one or more virtual overlay elements to overlay the real-world scenery viewed by the user 102 through the AR device 101. (For a VR device, similar VR componentry be used in place of the componentry described with respect to FIG. 2.)

Figure 3A:
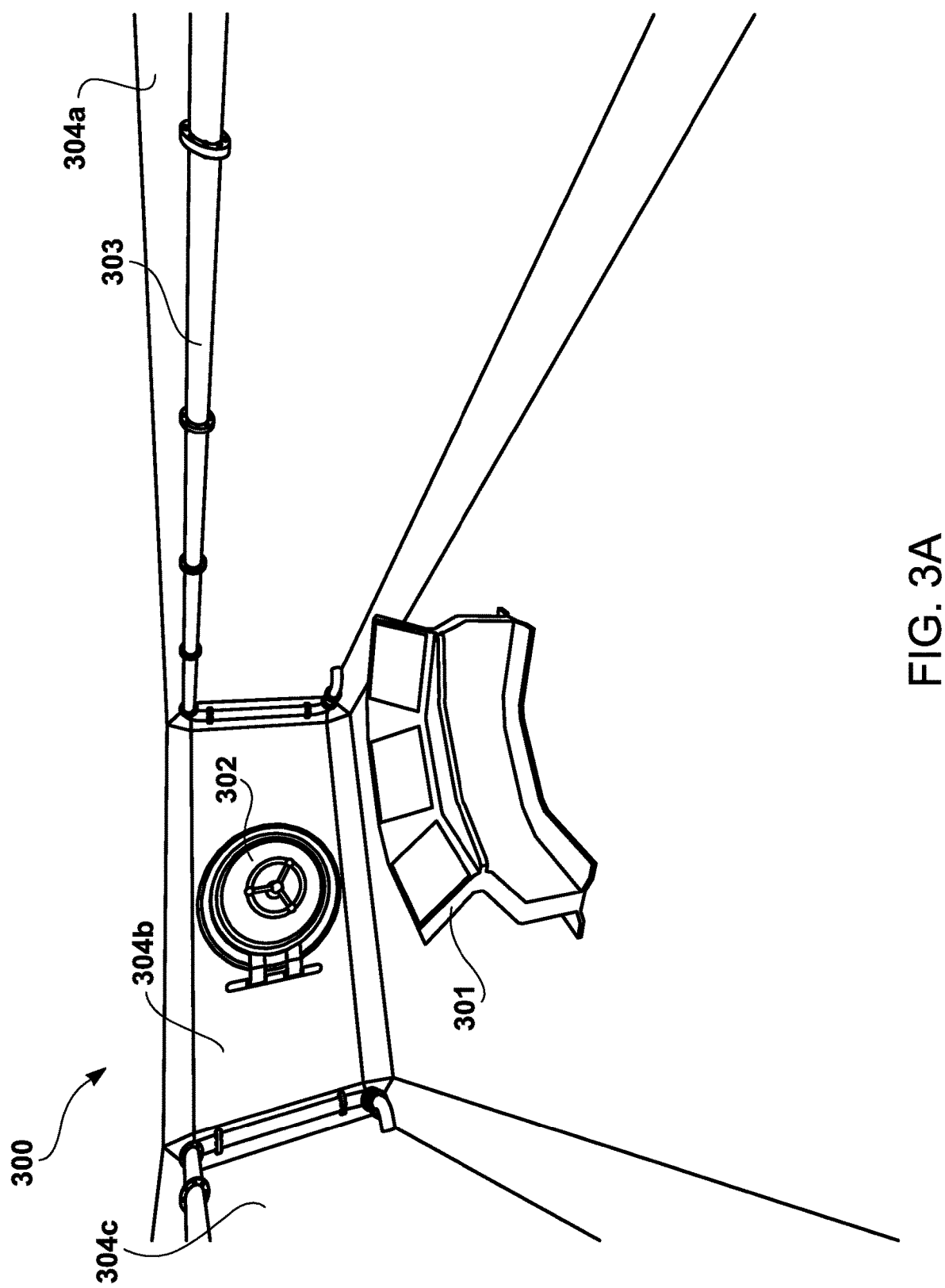
FIG. 3A illustrates an example of the real-world elements of the AR environment.
Figure 3B:
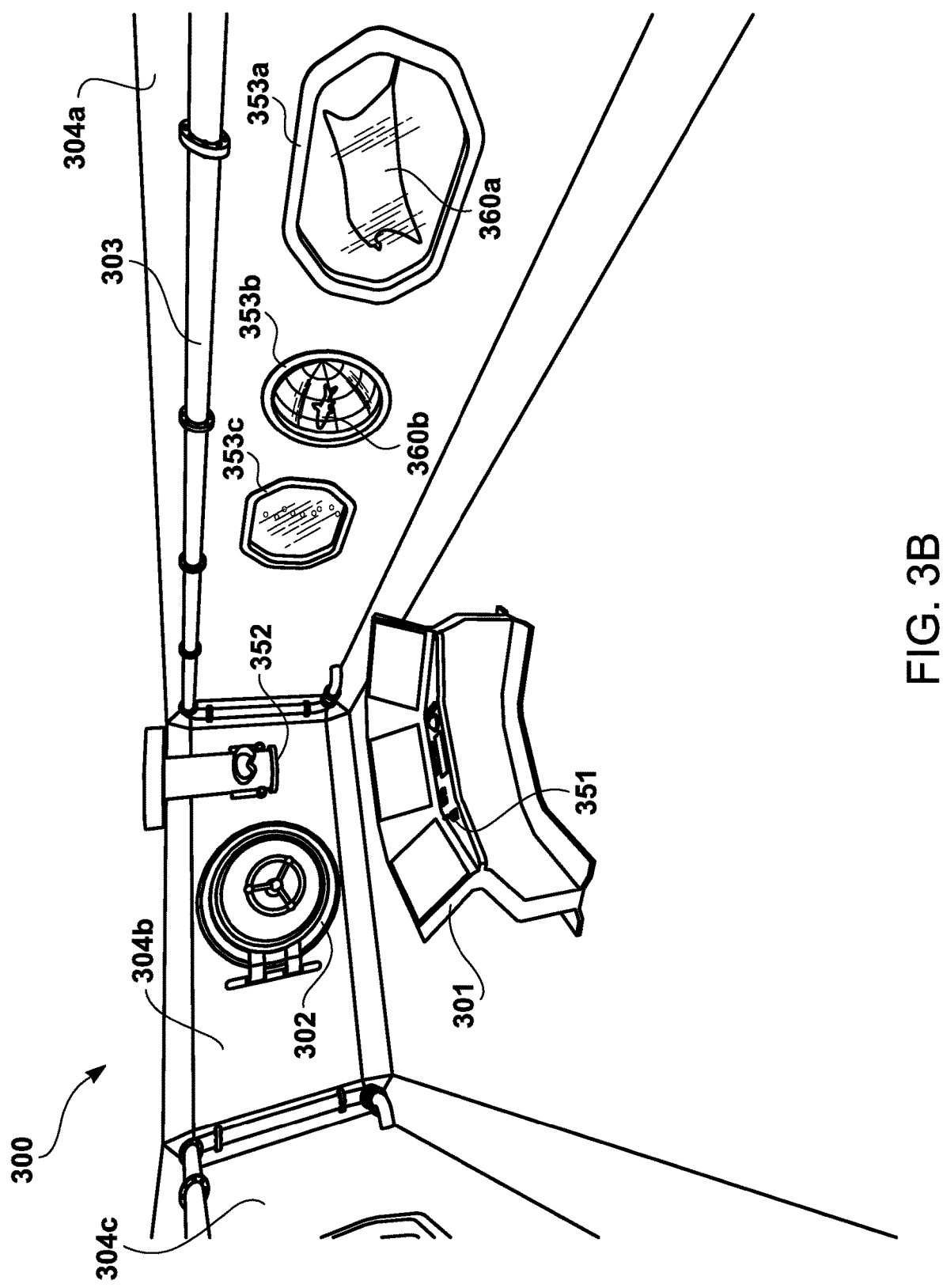
FIG. 3B illustrates an example of the AR experience that may be viewed by the user when using the AR device illustrated in FIG. 1.

Furthermore, FIGS. 3A and 3B illustrate an AR environment 300 in which the user 102, illustrated in FIG. 1, may use the AR device 101 to participate in an AR experience. In particular, FIG. 3A illustrates an example of the real-world elements of the AR environment 300. For instance, the AR environment 300 may be an interactive submarine experience with corresponding real-world props. (The interactive submarine experience is provided only as an example for illustrative purposes, given that a variety of different AR environments may be used instead.) Examples of such real-world props include a submarine control console 301, a submarine hatch 302, and a pipe 303. Further, the AR environment 300 may have one or more real-world boundaries, such as walls 304a-c. If the user 102 is not wearing and/or operating the AR device 101, illustrated in FIG. 1, the real-world elements and real-world props are visible to the user 102.

Moreover, FIG. 3B illustrates an example of the AR experience (i.e., virtual elements overlaying the real-world elements illustrated in FIG. 3A) that may be viewed by the user 102 when using the AR device 101 illustrated in FIG. 1. Some virtual elements may overlap some of the real-world elements and real-world props, rendering them invisible to, or difficult to view by, the user 102; whereas other virtual elements may not provide such interference. For example, the AR device 101 may generate virtual console input devices 351 that overlay the real-world, submarine control console 301. Even though the submarine control console 301 may have no input devices integrated thereon, the AR device 101 allows the user 102 to perceive interaction with input devices situated on the submarine control console 301. As another example, the AR device 101 may generate a virtual periscope 352 that is movable based on interactions between the user 102 and the virtual console input devices 351. The foregoing examples illustrate virtual elements overlaying real-world objects, rather than real-world boundaries. As yet another example, the AR device 101 may generate various virtual windows 353a-c from which the user 102 may view various virtual fish 360a and 360b; this example illustrates virtual elements overlaying a real-world boundary (e.g., the wall 304a), thereby rendering portions of that real-world boundary invisible to the user 102.

Figure 4A:
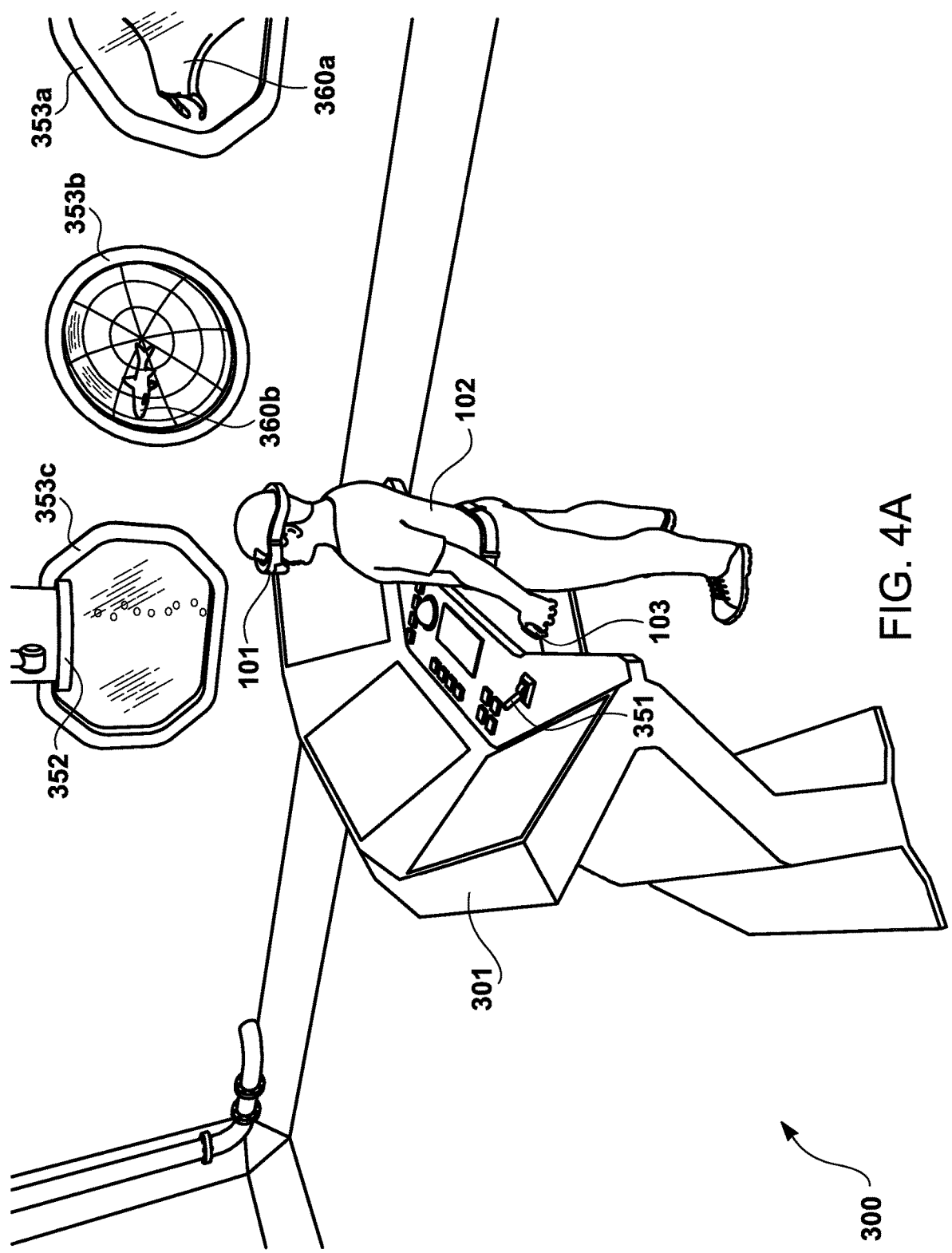
FIG. 4A illustrates a side perspective view of the user operating the AR device to generate the virtual elements illustrated in FIG. 3B within the AR environment.
Figure 4B:
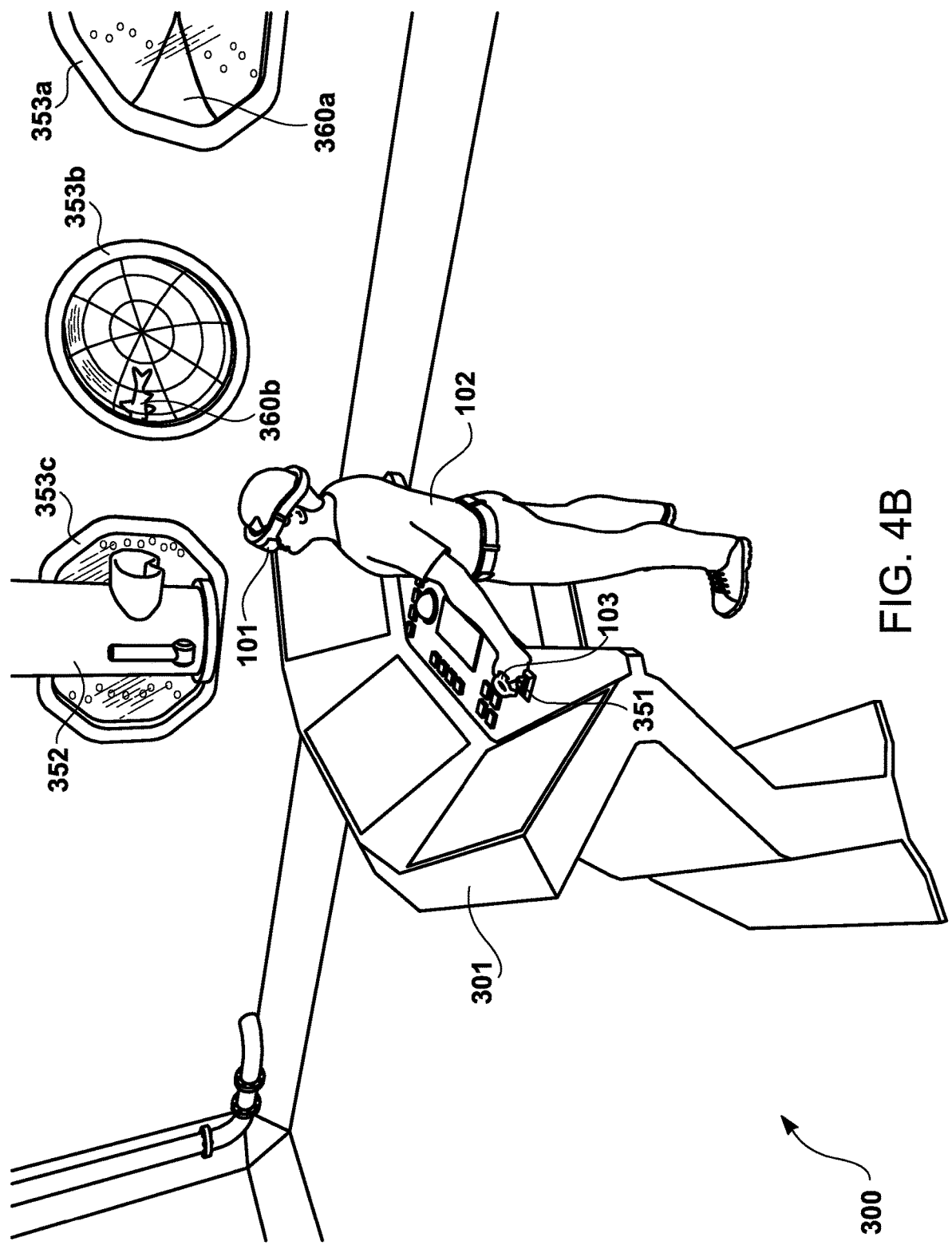
FIG. 4B illustrates the AR device tracking the AR device accessory in relation to virtual console input devices.
Figure 4C:
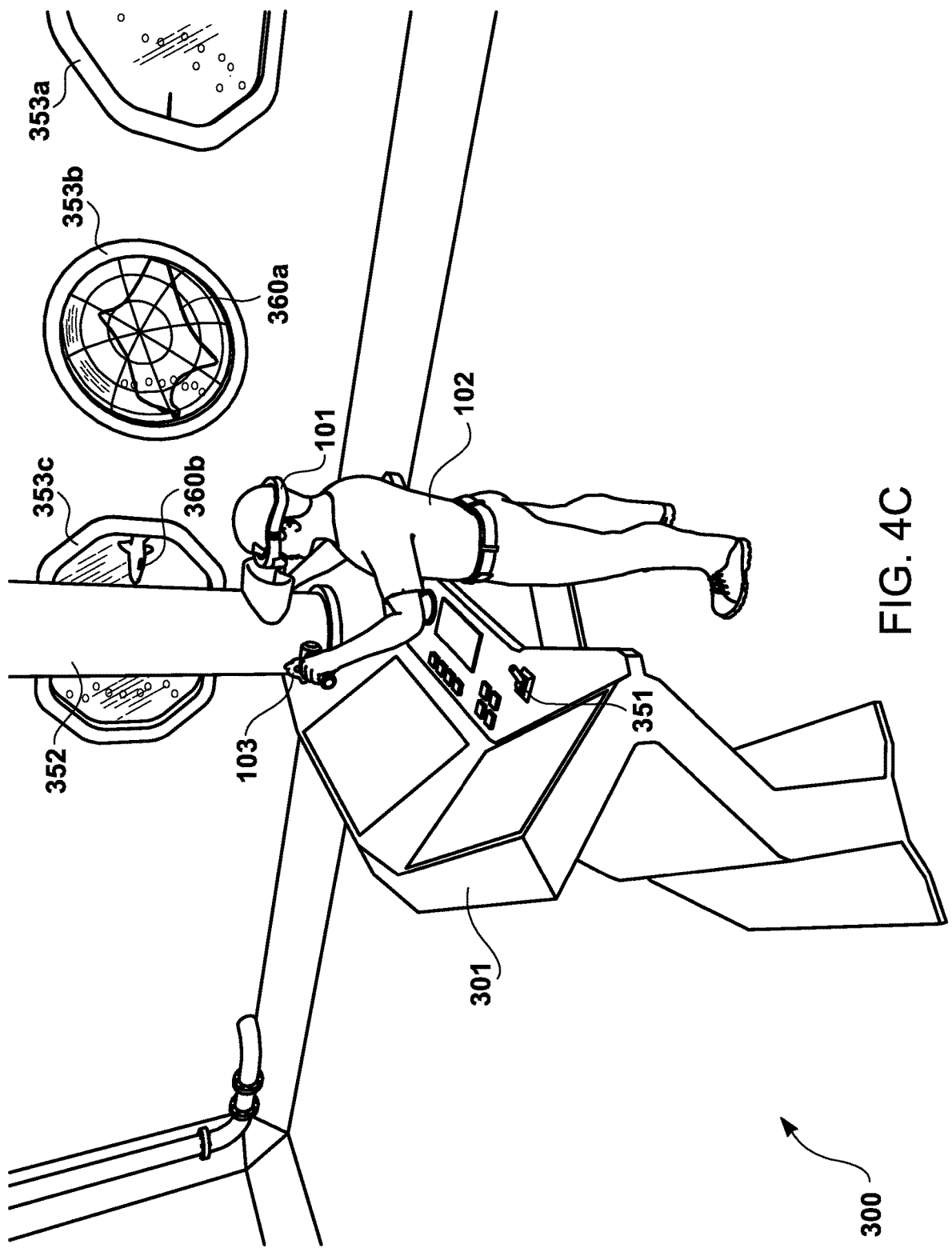
FIG. 4C illustrates a virtual periscope being fully extended so that the user may view additional virtual imagery through it.

FIGS. 4A-4C illustrate a side perspective view of the AR environment 300, illustrated in FIG. 3B, with the user 102, illustrated in FIG. 1, interacting with virtual elements that overlay a real-world object. In particular, FIG. 4A illustrates a side perspective view of the user 102 operating the AR device 101 to generate the virtual elements illustrated in FIG. 3B within the AR environment 300. The AR device 101 may track the movements of the AR device accessory 103 to determine interaction with the virtual elements. As an example, FIG. 4B illustrates the AR device 101 tracking the AR device accessory 103 in relation to the virtual console input devices 351. The AR device 101 may determine that the user 102 has positioned the AR device accessory 103 in proximity to one of the virtual console input devices 351 (e.g., a virtual periscope lever). As a result, the AR device 101 may generate virtual imagery corresponding to the virtual periscope 352 moving downward with respect to the user 102. Further, FIG. 4C illustrates the virtual periscope 352 being fully extended so that the user 102 may view additional virtual imagery through it. (Given that the views illustrated in FIGS. 4A-4C are not from the perspective of the AR device 101, the virtual elements are depicted only for illustrative purposes to connote the presence of such imagery within the AR environment 300.)

In one embodiment, the AR device 101 distinguishes between virtual elements that are or are not overlaying real-world boundaries to determine whether or not to generate a cue for the user 102. Given that the virtual elements (e.g., virtual periscope 352) with which the user 102 is interacting in FIGS. 4A-4C are not overlaying real-world boundaries, the AR device 101 may not provide a cue to the user 102. In another embodiment, the AR device 101 may provide a cue (e.g., visible light imagery emitted on the virtual console input devices 351), as illustrated in FIGS. 5A-5C or FIGS. 8A-8B, to the user 102 to prompt the user 102 to interact with the cued virtual element. For example, interaction with a virtual periscope lever may move the virtual periscope 352 down for the user 102 to view new virtual scenery.

Figure 5A:
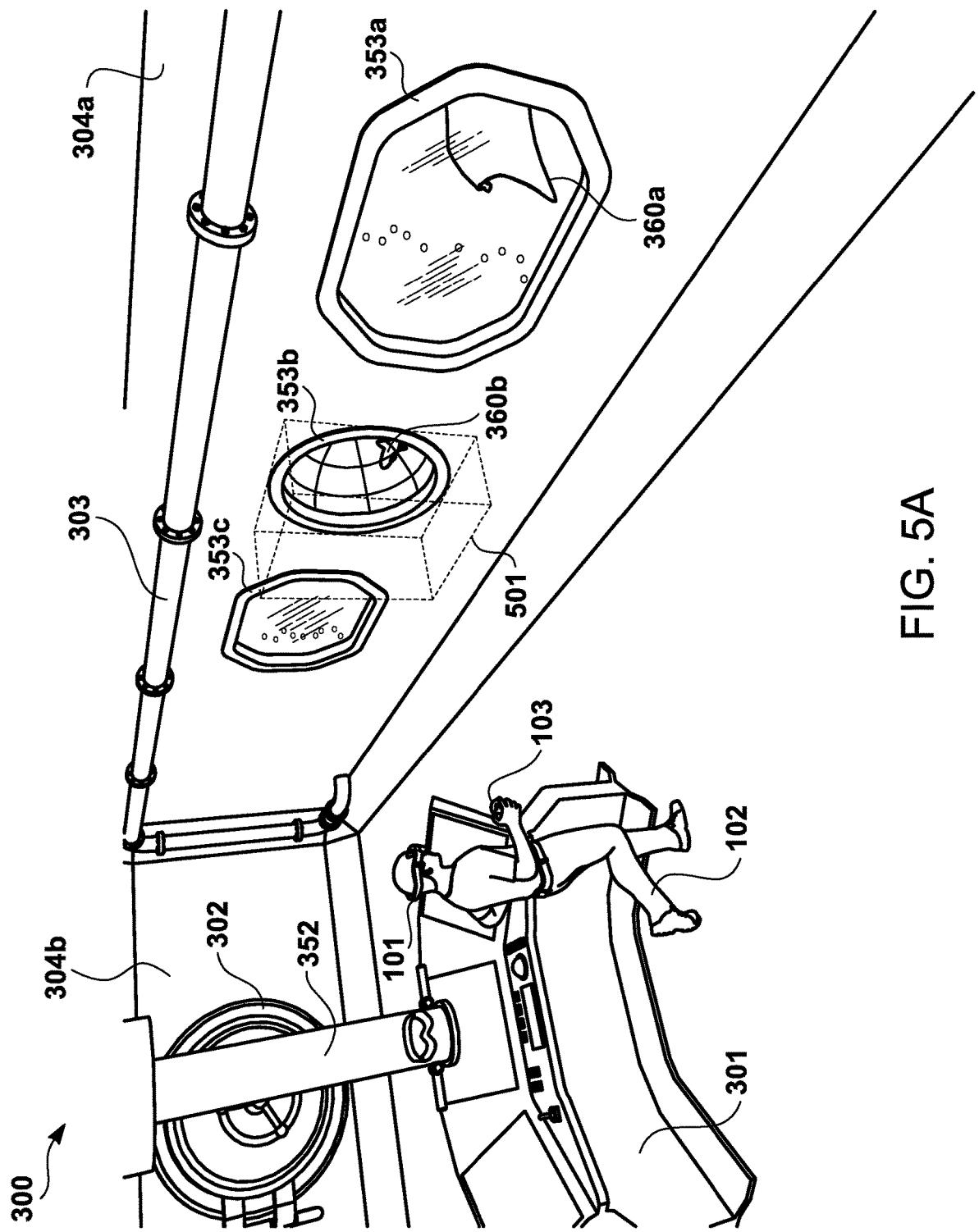
FIG. 5A illustrates the user beginning movement, which may be detected by the AR device and/or the AR device accessory, toward a virtual window.
Figure 5B:
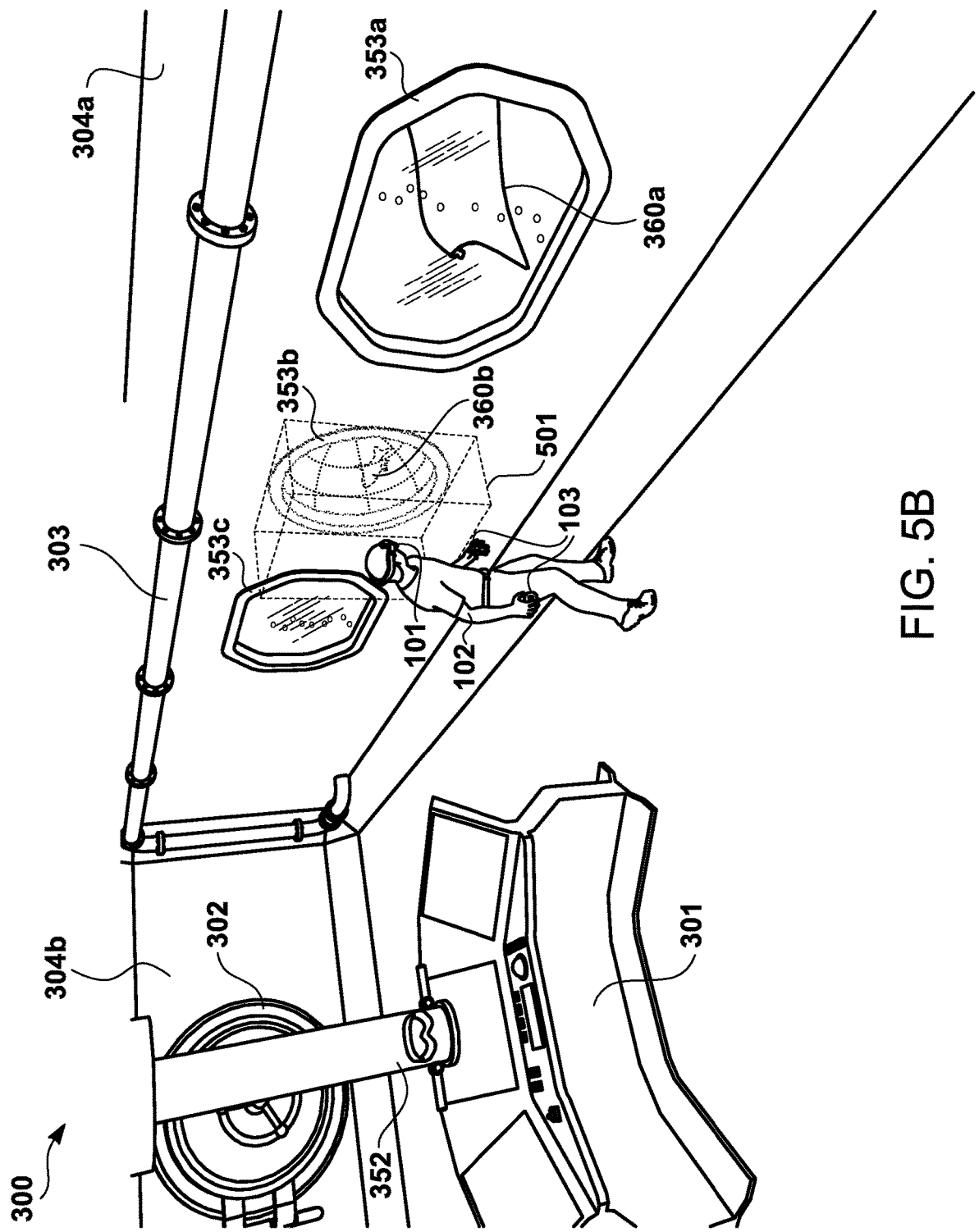
FIG. 5B illustrates the user moving within a proximity zone, or within a predetermined proximity threshold outside or inside the proximity zone, with respect to the virtual window.
Figure 5C:
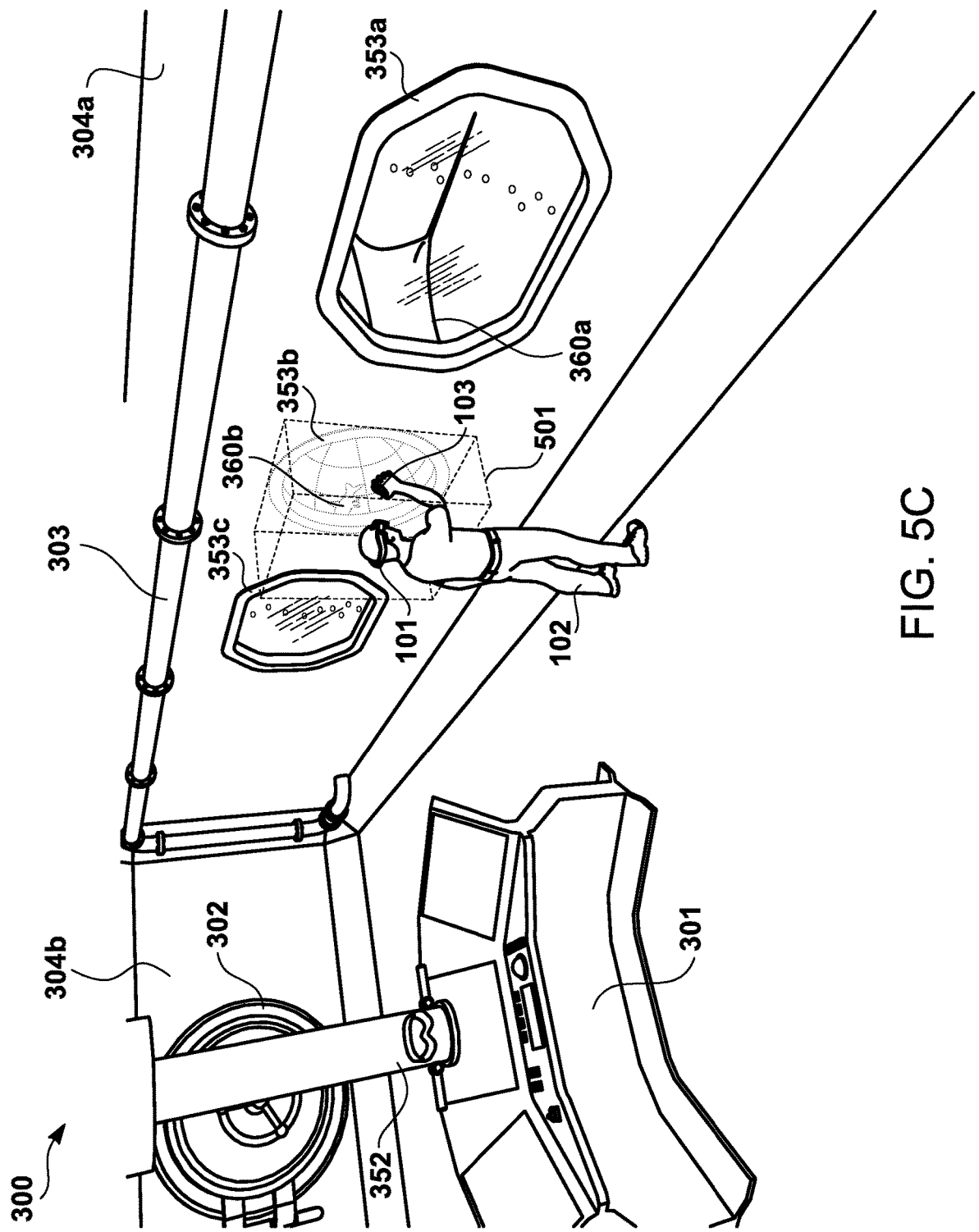
FIG. 5C illustrates a virtual fish being almost fully faded out given that a hand of the user is substantially within the proximity zone and moving toward the virtual fish.

FIGS. 5A-5C illustrate a side perspective view of the user 102 moving toward the virtual window 353b. For example, the user 102 may view the virtual fish 360b through the virtual window 353b, which is dome-shaped and appears to protrude outwardly from the submarine in the AR environment 300. In other words, the user 102 perceives that he or she may place his or her arm and/or head within the external protrusion to have a better view of the virtual fish 360b; yet, in reality, the real-world element of the wall 304a is blocking such movement by the user 102. Such potential collision poses a significant safety concern.

To minimize, or preempt, this safety concern, the AR device 101 may determine if the movement of the AR device 101 and/or the AR device accessory 103 meet one or more mobility criteria, which are based on movement of the user 102 toward the virtual window 353b. As an example, one mobility criterion may be a velocity threshold. As illustrated in FIG. 5A, the user 102 may begin movement, which may be detected by the AR device 101 and/or the AR device accessory 103, toward the virtual window 353b. Even if the user 102 is at a significant distance from the virtual window 353b, the user 102 may be moving at a velocity that places himself or herself on a relatively fast trajectory toward the virtual window 353b. Other types of criteria, such as acceleration, may be used in addition, or as an alternative, to the velocity threshold.

As another example, a mobility criterion may be an orientation threshold. The AR device 101 may determine that the orientation of the AR device 101 and/or AR device accessory 103 falls within an angular displacement threshold (e.g., plus or minus five degrees) with respect to the virtual window 353b, thereby placing the user 102 on a path toward the virtual window 353b. Even if the user 102 were in proximity to the virtual window 353b, that may not matter if the orientation of the AR device 101 and/or the AR device accessory 103 indicated that the user 102 was moving away from the virtual window 353b (e.g., his or her back to the virtual window 353b) or parallel to the virtual window 353b (e.g., walking through a narrow hallway alongside the virtual window 353b).

Additionally, or in the alternative, as illustrated in FIG. 5B, the AR device 101 may detect that the user 102 has moved within a proximity zone 501, or within a predetermined proximity threshold outside or inside the proximity zone 501, with respect to the virtual window 353b. In one embodiment, the AR device 101 primarily determines movement within the proximity zone 501 based on movement of the AR device accessory 103; the reason being that the user 102 is more likely to reach out toward a virtual object with his or her hand before extending his or her head. Secondarily, the AR device 101 may determine such movement within the proximity zone 501 based on additional movement, such as movement of the AR device 101. In other words, the AR device 101 may necessitate movement of both the AR device 101 and the AR device accessory 103 within the proximity zone 501, just movement of the AR device accessory 103 alone within the proximity zone 501, or just movement of the AR device 101 alone within the proximity zone 501. Other types of displacement thresholds may be used instead of the predetermined proximity threshold in relation to the proximity zone 501. For example, a distance threshold with respect to the wall 304a may be used without any zone.

Using multiple mobility criteria, the AR device 101 may avoid false positives, while also accurately determining intentional movement by the user 102 toward a virtual element that overlays a real-world element. (Alternatively, a single mobility criterion may be used instead of multiple criteria.) In other words, the AR device 101 may use a plurality of mobility criteria together to predict the likelihood of the user 102 colliding with the wall 304a; the AR device 101 may then alert the user 102 prior to the predicted collision.

In one embodiment, upon determining that one or more mobility criteria have been met, the AR device 101 may adjust rendering of a virtual element, such as the virtual window 353b, to increase visibility of a real-world element, such as the wall 304a. By fading out the virtual element (i.e., by adjusting the transparency), as illustrated by FIG. 5B, the AR device 101 provides a cue to the user 102 so that the user 102 better perceives the overlaid real-world element, and may avoid a collision or view a real-world element (e.g., real-world special effect) that the AR device 101 wants the user 102 to view at that time.

Furthermore, the fading out may be scaled—performed to varying degrees based on the compliance level with the mobility criteria. For example, as illustrated in FIG. 5C, the virtual fish 360b is almost fully faded out given that the hand of the user 102 is substantially within the proximity zone 501 and moving toward the virtual fish 360b. By way of contrast, the virtual fish 360b was not faded out to the same degree when the hand of the user 102 was not positioned directly within the proximity zone 501, as illustrated in FIG. 5B.

In one embodiment, the mobility criteria may be weighted such that a particular condition for one criterion being met results in that criterion being weighted more heavily in the determination by the AR device 101 of compliance with the mobility criteria. For example, the hand of the user 102 being oriented toward the virtual fish 360*b* and being substantially within the proximity zone 501 may be factors that are weighted more heavily than the user 501 not moving with significant velocity, as illustrated in FIG. 5C. By way of contrast, the user 102 may be moving with such significant velocity, as illustrated in FIG. 5A, that the hand of the user 102 not being within the proximity zone 501 may not be weighted as heavily as the velocity criterion.

Figure 6:
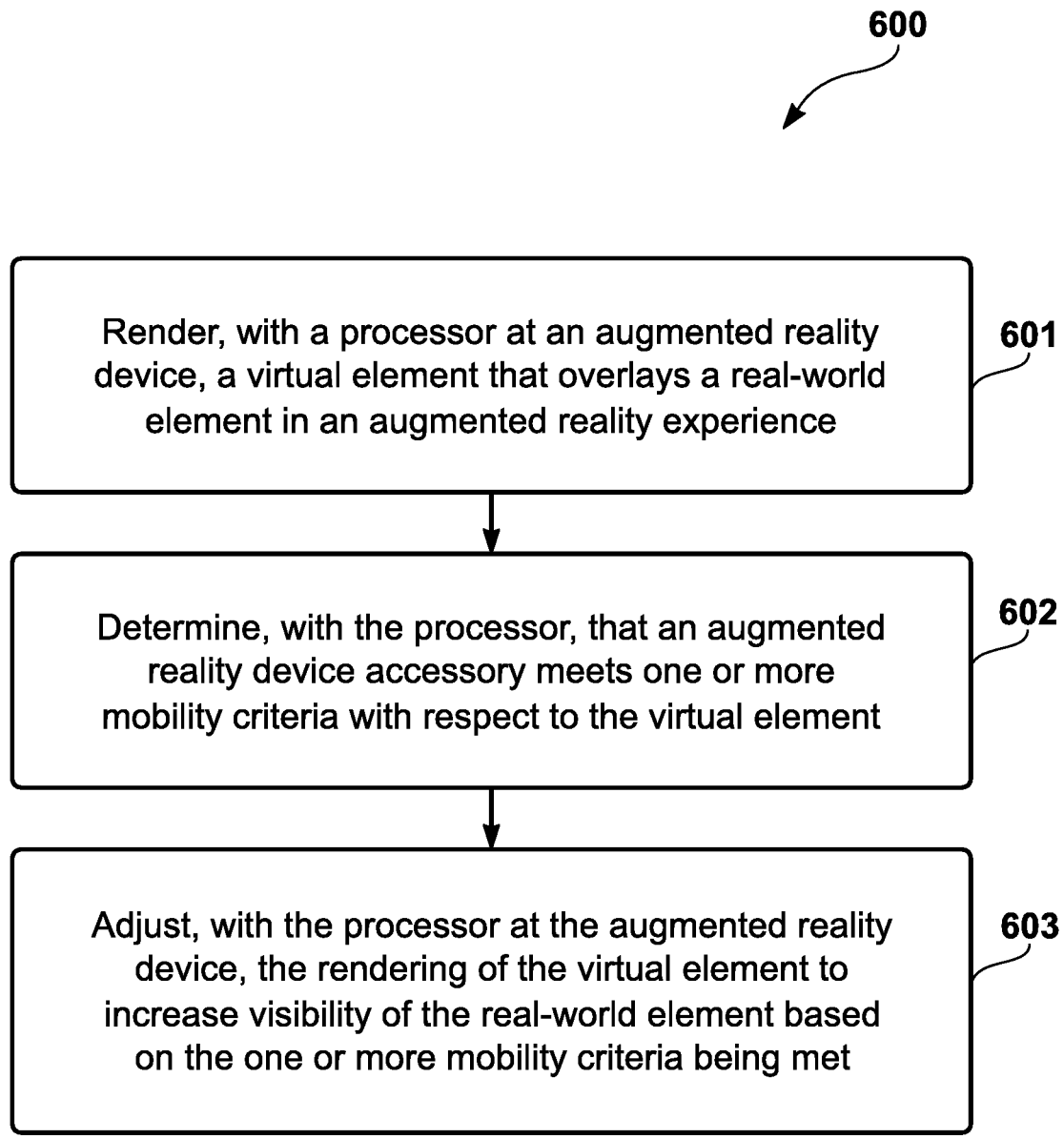
FIG. 6 illustrates a process that may be used by the AR device, illustrated in FIG. 1, to generate one or more cues, such as the fade out cues illustrated in FIGS. 5A-5C.

FIG. 6 illustrates a process 600 that may be used by the AR device 101, illustrated in FIG. 1, to generate one or more cues, such as the fade out cues illustrated in FIGS. 5A-5C. At a process block 601, the process 600 renders, with the AR device processor 201 at the AR device 101, a virtual element that overlays a real-world element in an AR experience. Further, at a process block 602, the process 600 determines, with the AR device processor 201, that the AR device accessory 103 meets one or more mobility criteria with respect to the virtual element. Finally, at a process block 603, the process 600 adjusts, with the AR device processor 201 at the AR device 101, the rendering of the virtual element to increase visibility of the real-world element based on the one or more mobility criteria being met. As an example, the AR device 101 may increase the transparency level (e.g., via less pixel illumination, intensity, etc.) of the virtual element to render the virtual element partially, or fully, transparent.

Although the cues illustrated in FIGS. 5A-5C were exemplified as fading out virtual elements in the AR environment 300, illustrated in FIG. 3B, other types of cues may be used by the AR device 101 to alert the user 102. For example, the cues may be one or more indicia (e.g., markings) that are rendered over, or in proximity to, the virtual elements.

Figure 7A:
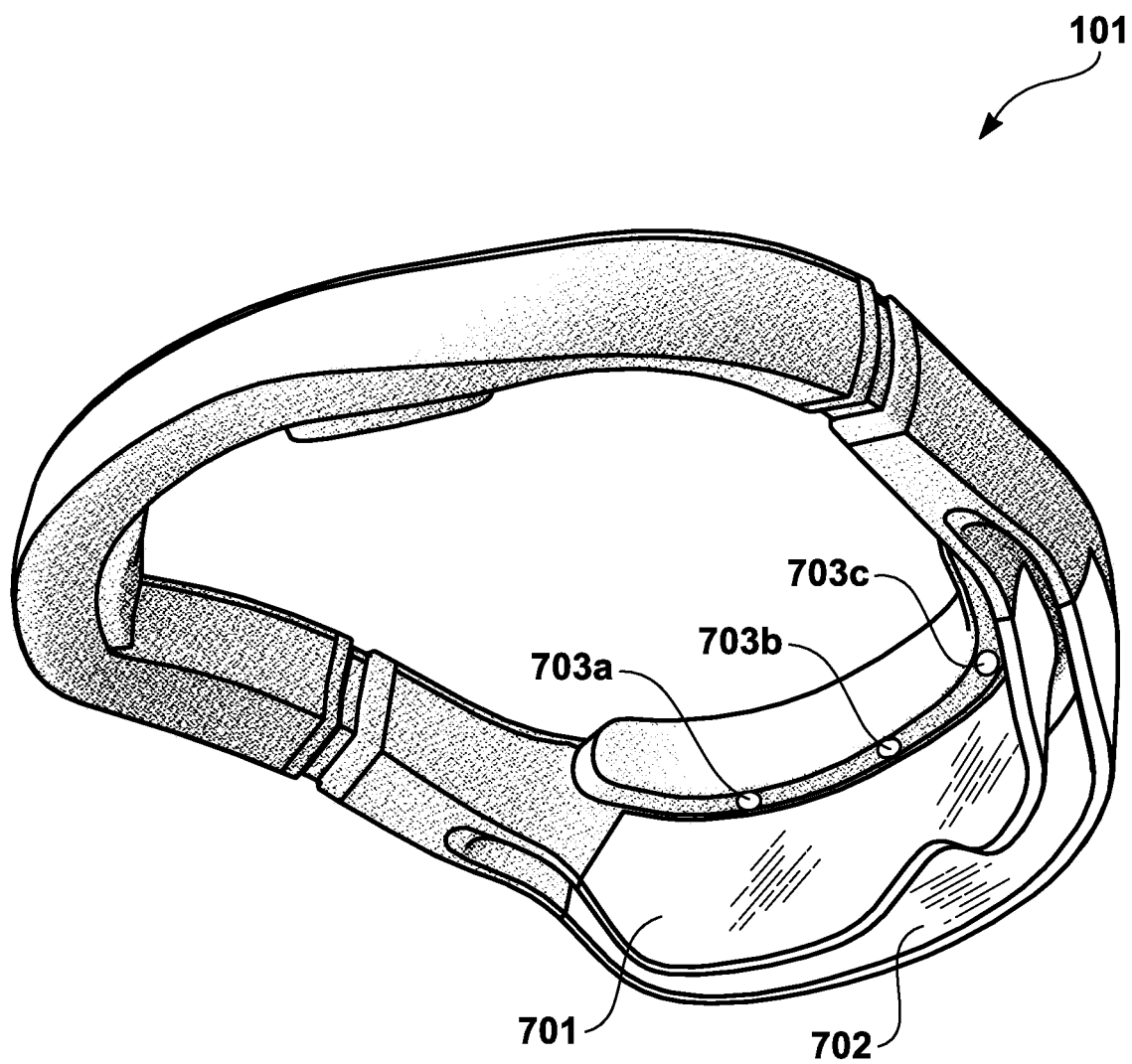
FIG. 7A illustrates the AR device having one or more light emitting diodes ("LED") that emit a cue to the user, illustrated in FIG. 1, in the form of visible light.
Figure 7B:
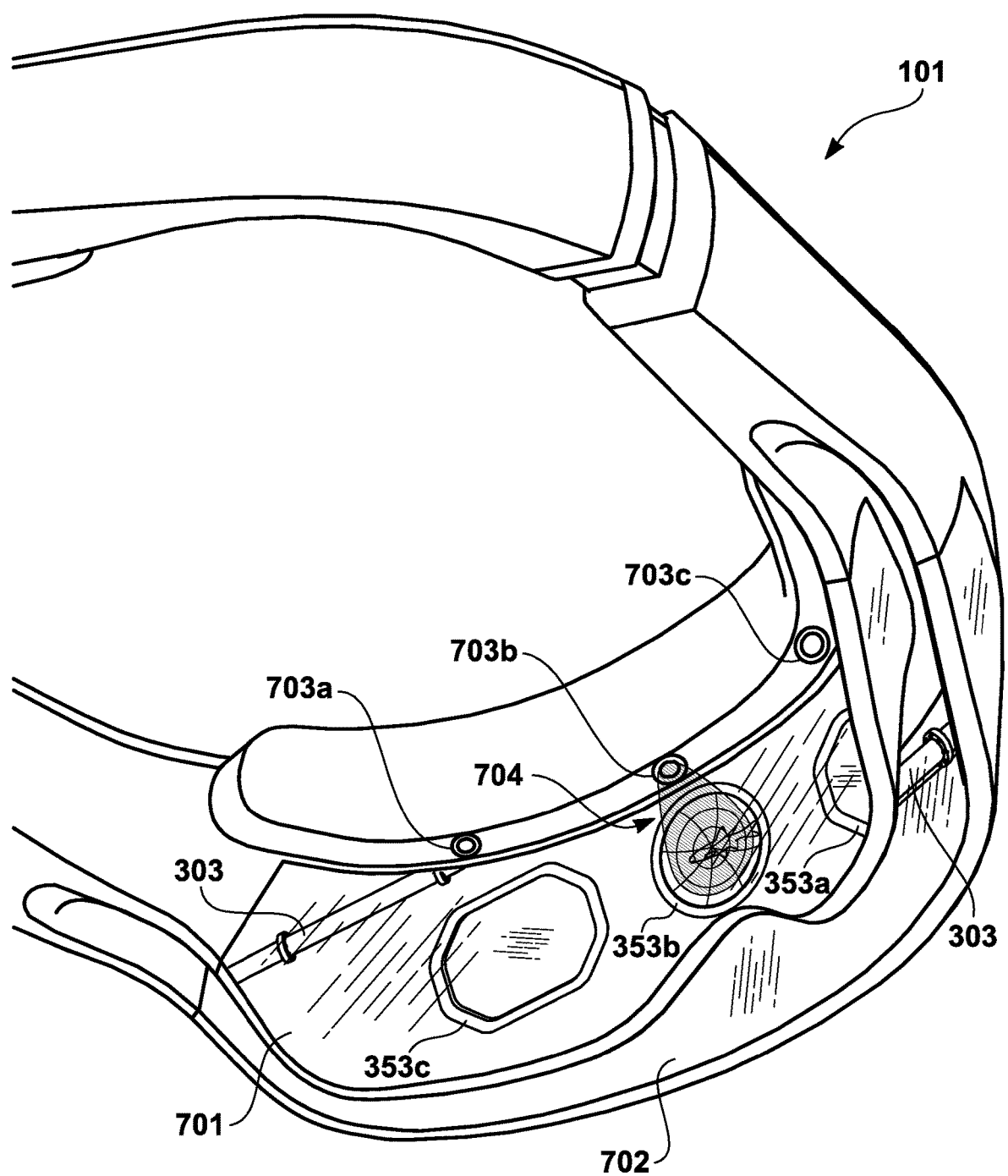
FIG. 7B illustrates the LED emitting an indicium toward the virtual fish viewed through the virtual window in the AR environment.

FIGS. 7A and 7B illustrate a rear perspective view of a configuration of the AR device 101, illustrated in FIG. 1, that may be used to emit one or more cues. As illustrated in FIG. 7A, in this configuration, the AR device 101 may have one or more LEDs 703*a-c* that emit a cue to the user 102, illustrated in FIG. 1, in the form of visible light. For example, the AR device 101 may have an outer viewing portion 702 (e.g., glass) that the user 102 may use to view real-world elements in the AR experience 300, illustrated in FIG. 3A. Further, the AR device 101 may have an inner viewing portion 701 (e.g., glass, plastic, display screen, smart computing device, etc.), which overlays the virtual elements over the real-world elements, as illustrated in FIG. 3B. Upon determining that one of the mobility criteria has been met, the AR device 101 may emit a cue, via one or more of the LEDs 703*a-c* focused on the virtual element that is the subject of the cue, to be displayed on the inner viewing portion 701. Accordingly, in one embodiment, the LEDs 703*a-c* may be positioned on the interior of the AR device 101. As an example, FIG. 7B illustrates the LED 703*b* emitting an indicium 704 (e.g., geometrical shape, logo, text, etc.) toward the virtual fish 360*b* viewed through the virtual window 353*b* in the AR environment 300. For instance, text indicating "Do Not Touch" may be used to alert the user 102 to stay at a safe distance from the wall 304*a*.

Figure 7C:
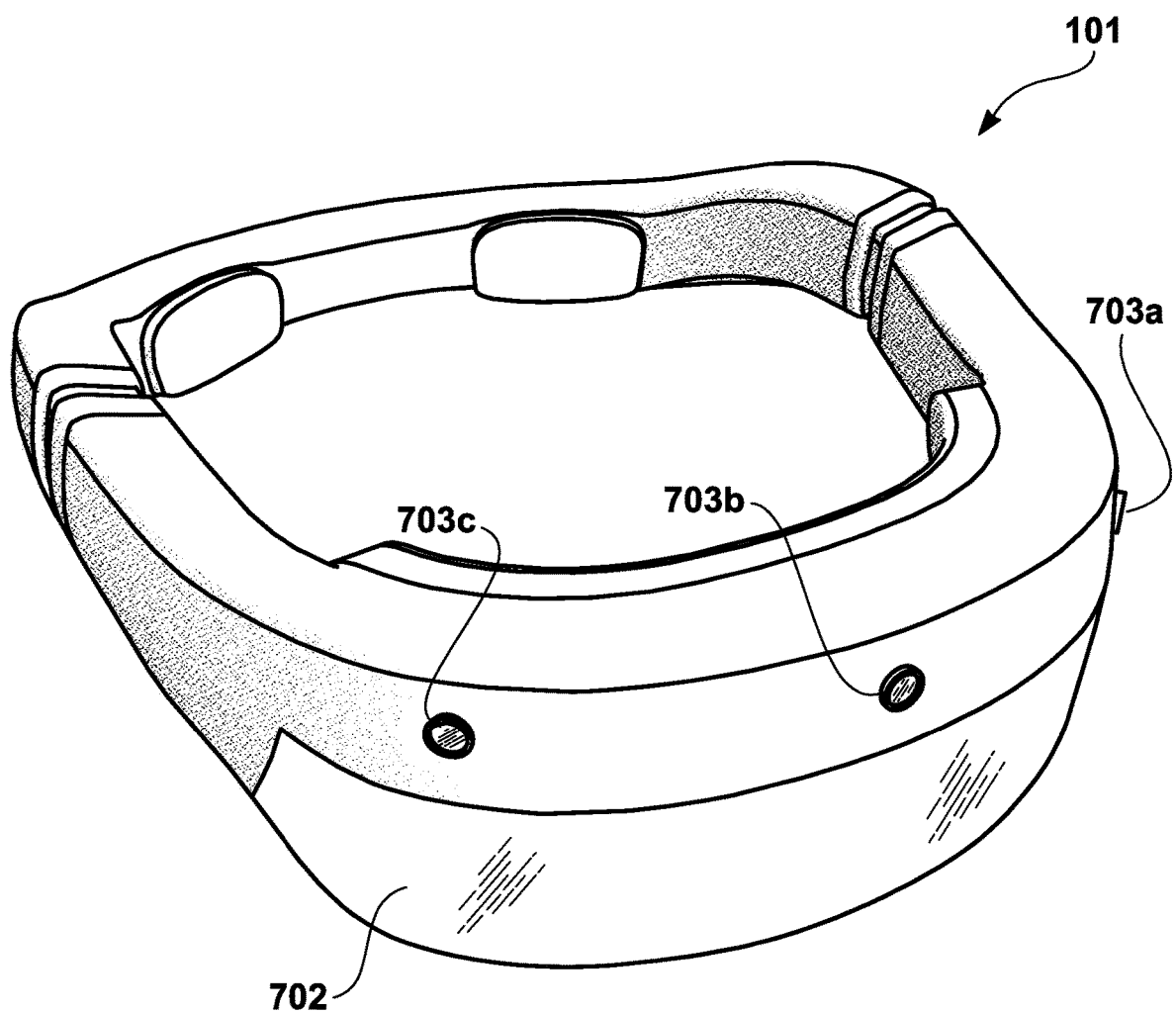
FIG. 7C illustrates a front perspective view of the AR device in which the LEDs are positioned above the exterior viewing portion.
Figure 7D:
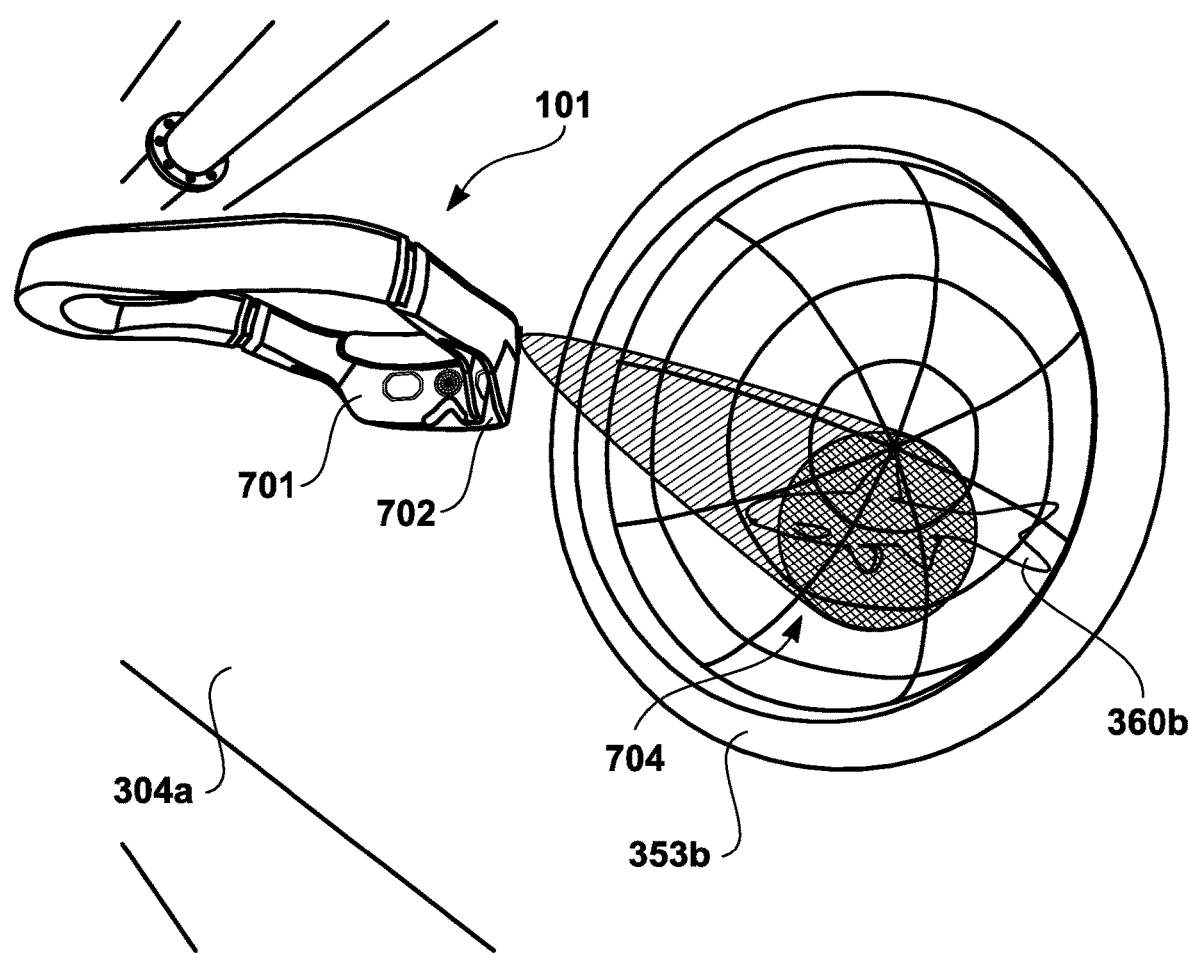
FIG. 7D illustrates the indicium that is emitted by one or more of the LEDs toward the portion of the wall that is underneath the virtual fish.

In an alternative embodiment, as illustrated in FIGS. 7C and 7D, the LEDs 703*a-c* may be positioned on the exterior of the AR device 101, or in between the interior portion 701 and the exterior portion 702. For example, FIG. 7C illustrates a front perspective view of the AR device 101 in which the LEDs 703*a-c* are positioned above the exterior viewing portion 702. Upon determining that one or more of the mobility criteria have been met, the AR device 101 may emit a cue, via one or more of the LEDs 703*a-c* focused on the real-world element that is the subject of the cue, to be viewable by the user 101 through the exterior viewing portion 702. As a result, the user 102 may perceive the cue focused on the real world element through the overlay of the virtual element. FIG. 7D illustrates the indicium 704 that is emitted by one or more of the LEDs 703*a-c* toward the portion of the wall 304*a* that is underneath the virtual fish 360*b*.

Alternatively, projectors or other delivery apparatuses may be integrated within, or adhered to, the AR device 101 to display the indicium 704 on the inner viewing portion 701 and/or the outer viewing portion 702. As yet another alternative, the AR device processor 201 (FIG. 2) may adjust the rendering of the virtual elements to augment the indicium 704 within the imagery itself, without any emission or projection.

Figure 8A:
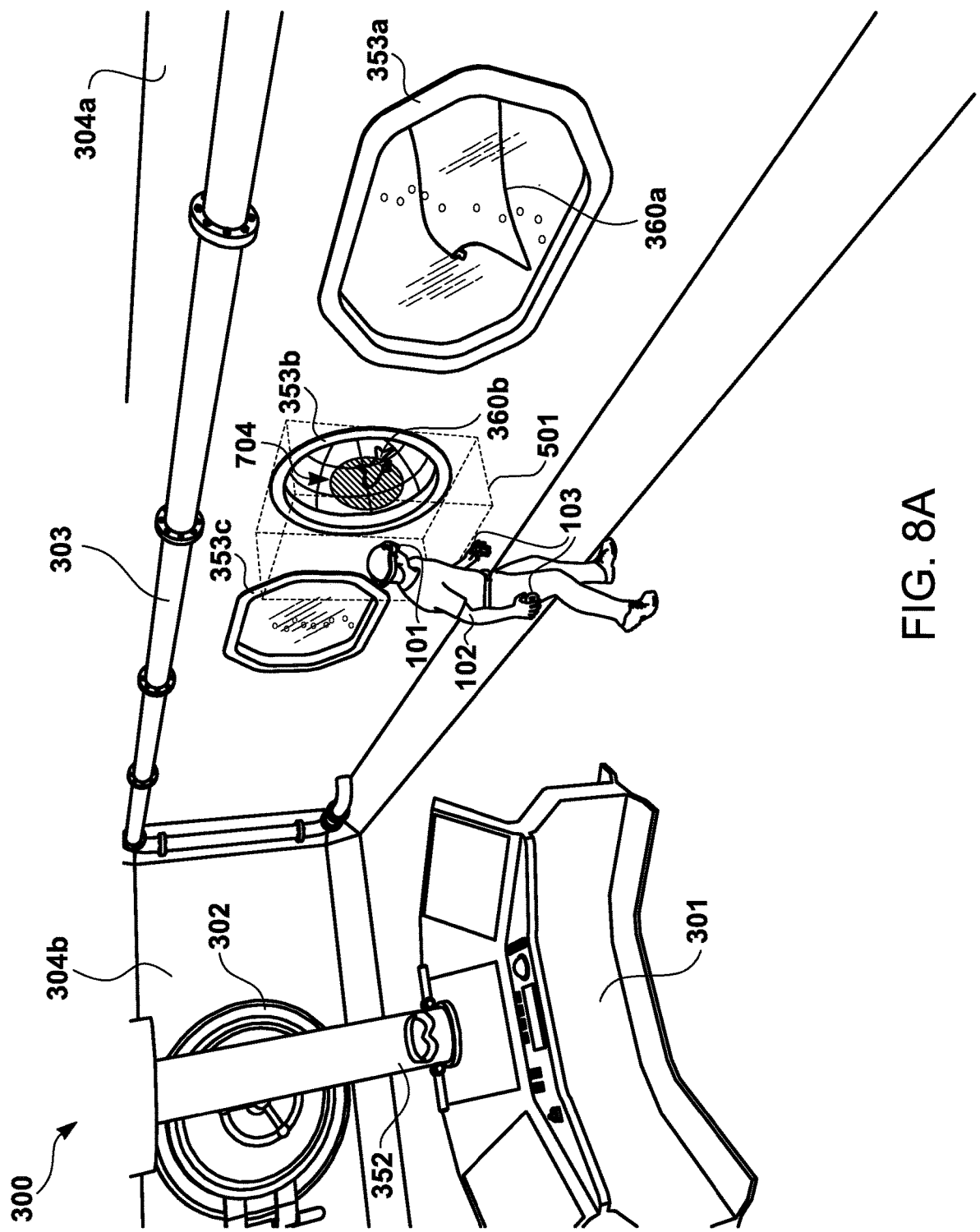
FIG. 8A illustrates the user situated at sufficient proximity to the proximity zone for the AR device to emit a geometrically shaped indicium within the AR device to alert the user.
Figure 8B:
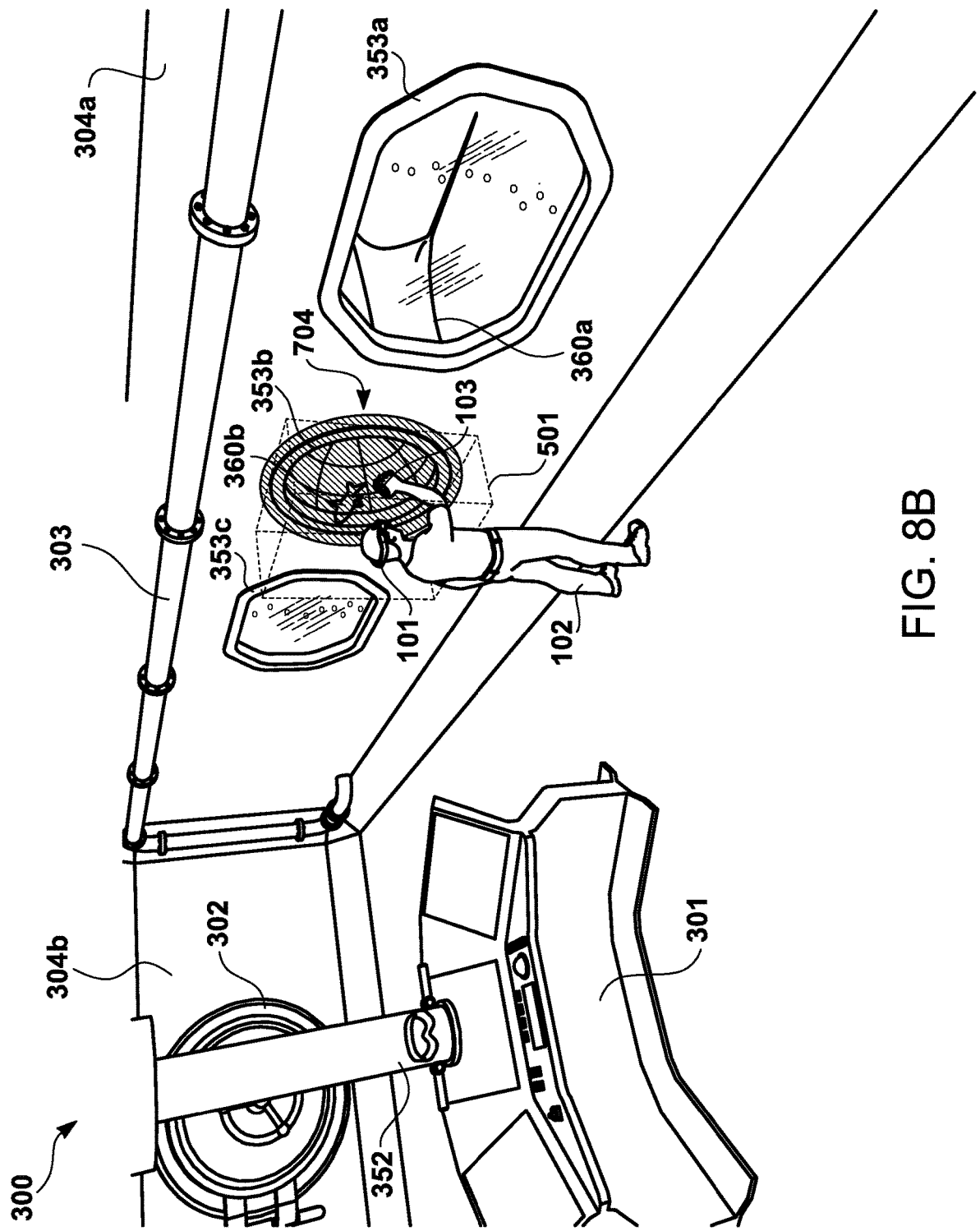
FIG. 8B illustrates the AR device adjusting one or more properties, such as dimensions, based on varying degrees of compliance with the one or more mobility criteria.

FIGS. 8A and 8B illustrate a side perspective view of the user 102 moving toward the virtual window 353*b*. In particular, FIG. 8A illustrates the user 102 situated at sufficient proximity to the proximity zone 501 for the AR device 101 to emit the indicium 704 (e.g., geometrical shape) within the AR device 101 to alert the user 102. (The indicium 704 is illustrated as being viewed from outside of the AR device 101 to depict overlaying the indicium 704 over the virtual fish 360*b*.) In another embodiment, one or more emission devices, or projectors, may be positioned external to the AR device 101 (e.g., wall-mounted), and may overlay the indicium 704 within the AR environment 300. Further, as illustrated in FIG. 8B, the AR device 101 may adjust one or more properties, such as dimensions, based on varying degrees of compliance with the one or more mobility criteria. Other properties include, but are not limited to, intensity, contrast, hue, luminance, resolution, etc.

Figure 9:
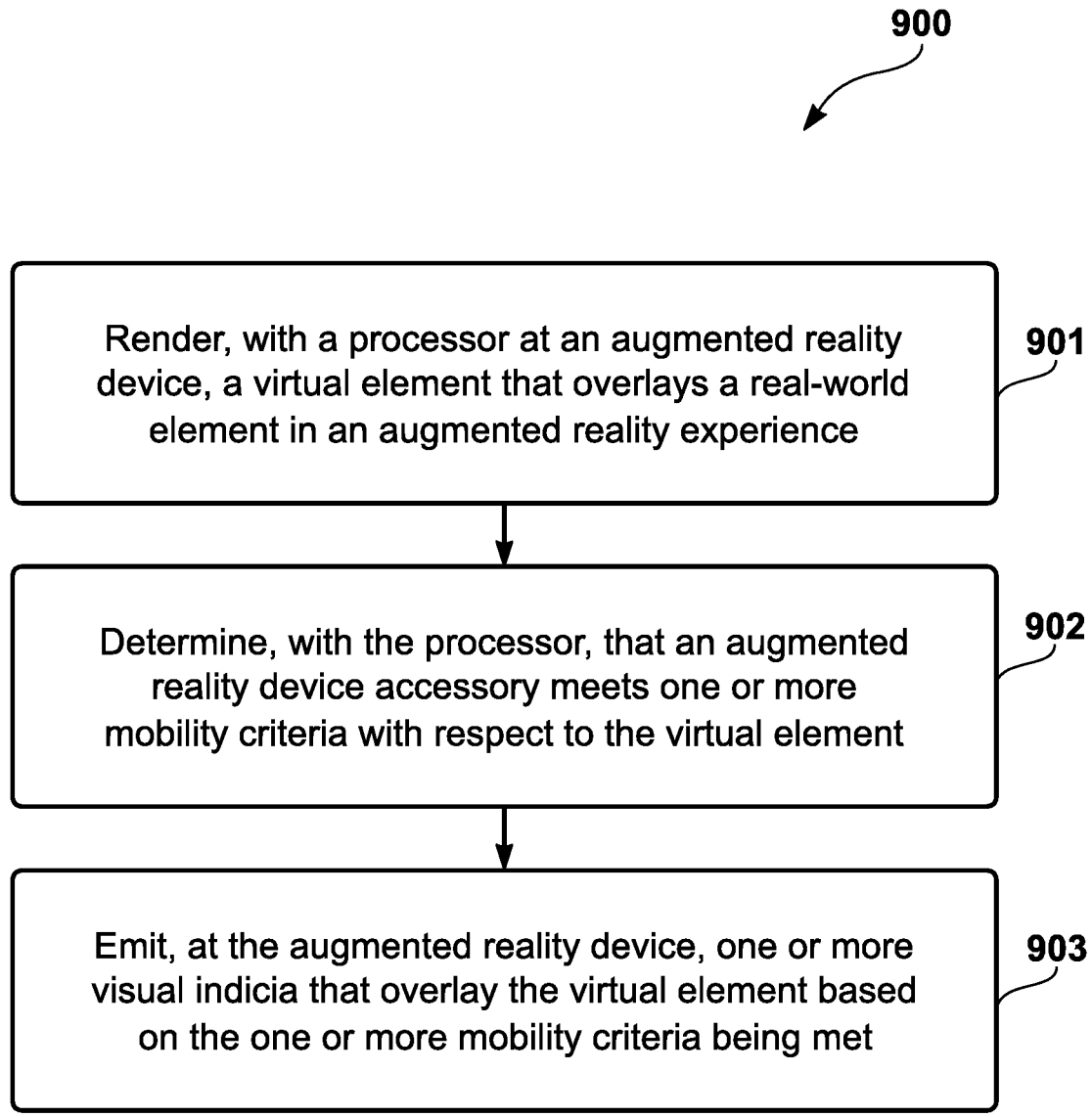
FIG. 9 illustrates a process that may be used by the AR device, illustrated in FIGS. 7A and 7B, to generate one or more cues, such as the indicium illustrated in FIGS. 8A and 8B.

FIG. 9 illustrates a process 900 that may be used by the AR device 101, illustrated in FIGS. 7A and 7B, to generate one or more cues, such as the indicium 704 illustrated in FIGS. 8A and 8B. At a process block 901, the process 900 renders, with the AR device processor 201 illustrated in FIG. 2, at the AR device 101, a virtual element that overlays a real-world element in an AR environment. Further, at a process block 902, the process 900 determines, with the AR processor 201, that the AR device accessory 103 meets one or more mobility criteria with respect to the virtual element. Finally, at a process block 903, the process 900 emits, at the AR device 101, one or more visual indicia 704 that overlay the virtual element based on the one or more mobility criteria being met.

The process 600 illustrated in FIG. 6 is described as an independent process from the process 900 illustrated in FIG. 9, but these processes may be integrated into a single process. For example, the AR device 101, illustrated in FIG. 1, may provide both fade-out cues and indicia 704 cues. As an example, the AR device 101 may both fade out the virtual fish 360*b*, illustrated in FIG. 3B, and emit the indicium 704, illustrated in FIG. 7A, on the virtual fish 360*b* upon the AR device accessory 103 and/or the AR device 101 meeting one or more mobility criteria.

Although the AR device 101, illustrated in FIG. 1, is described herein as performing the processing of the AR experience, a server, another cloud-based computing device, or a local computing device with wired or wireless communication capabilities for communicating with the AR device 101 may alternatively perform such processing. As yet another alternative, such computing device may perform only some of the processing (e.g., generating virtual overlays for the AR device 101, generating AR experience events, etc.).

Moreover, the configurations provided herein are not limited to visual cues. Other types of cues (e.g., auditory cues, haptic vibrations, etc.) may be emitted/outputted by the AR device 101, and/or associated accessories, upon the AR device 101 determining that one or more of the mobility criteria have been met.

The processes described herein may be implemented in a specialized processor. Such a processor will execute instructions, either at the assembly, compiled or machine-level, to perform the processes. Those instructions may be stored on a computer readable medium (e.g., computer readable storage device) capable of storing those instructions.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A computer program product comprising a non-transitory computer readable storage device having a computer readable program stored thereon, wherein the computer readable program when executed on a computer causes the computer to:

render, with a processor at an augmented reality device, virtual elements in an augmented reality experience;

identify, with the processor, individual ones of the virtual elements that are tied to individual real-world elements because they are overlaying the individual real-world elements to augment appearance of the individual real-world elements in views of a real-world environment, and individual ones of the virtual elements that are not tied to the individual real-world elements because they are not overlaying the individual real-world elements to augment the appearance of the individual real-world elements in the views of the real-world environment;

in response to identifying that a virtual element is tied to a real-world element because it is overlaying the real-world element to augment the appearance of the real-world element:

determine, with the processor, a potential collision of a user of the augmented reality device with the real-world element based on determining that an augmented reality device accessory meets one or more mobility criteria with respect to the virtual element; and generate a cue in response to the potential collision by adjusting, with the processor at the augmented reality device, a rendering of the virtual element to increase visibility of the real-world element based on the one or more mobility criteria being met; and in response to identifying that a second virtual element is not tied to a second real-world element because it is not overlaying a second real-world element to augment the appearance of the second real-world element, render, with the processor, the second virtual element without adjusting the rendering of the second virtual element to increase visibility of the second real-world element.

2. The computer program product of claim 1, wherein the one or more mobility criteria comprise velocity of the augmented reality device accessory toward the virtual element, such that the potential collision of the user of the augmented reality device with the real-world element is determined based on the velocity of the augmented reality device accessory toward the virtual element meeting or exceeding a velocity threshold.

3. The computer program product of claim 1, wherein the computer is further caused to perform the adjustment to the rendering of the virtual element based upon an additional mobility criterion being met, the additional mobility criterion being the augmented reality device accessory being at a position within a predetermined proximity threshold with respect to the virtual element.

4. The computer program product of claim 1, wherein the augmented reality device is a head-mounted display or a smartphone.

5. The computer program product of claim 1, wherein the augmented reality device accessory is a hand controller.

6. The computer program product of claim 2, wherein the computer is further caused to receive, at the augmented reality device from the augmented reality device accessory, velocity data associated with the augmented reality device accessory.

7. The computer program product of claim 1, wherein the one or more mobility criteria comprise the augmented reality accessory coming into a proximity zone defined around the virtual element, such that the potential collision of the user of the augmented reality device with the real-world element is determined based on the augmented reality device accessory moving into the proximity zone; and wherein the computer is further caused to receive, at the augmented reality device from the augmented reality device accessory, positional data associated with the augmented reality device accessory.

8. The computer program product of claim 1, wherein the one or more mobility criteria comprise orientation of the augmented reality device accessory in relation to the virtual element, such that the potential collision of the user of the augmented reality device with the real-world element is determined based on the orientation meeting or exceeding an angular displacement threshold; and wherein the computer is further caused to receive, at the augmented reality device from the augmented reality device accessory, orientation data associated with the augmented reality device accessory.

9. The computer program product of claim 2, wherein the computer is further caused to determine, at the augmented reality device, the velocity of the augmented reality device accessory.

10. The computer program product of claim 7, wherein the computer is further caused to track, at the augmented reality device, a position of the augmented reality device accessory based on the positional data.

11. The computer program product of claim 8, wherein the computer is further caused to determine, at the augmented reality device, the orientation of the augmented reality device accessory based on the orientation data.

12. The computer program product of claim 1, wherein the computer is further caused to dynamically scale, with the processor, the adjustment based on an increased level of compliance with the one or more mobility criteria.

13. The computer program product of claim 1, wherein the one or more mobility criteria comprise:

a velocity criterion based on a velocity of the augmented reality device accessory toward the virtual element;

a proximity criterion based on the augmented reality accessory coming into a proximity zone defined around the virtual element; and an orientation criterion based on an orientation of the augmented reality device accessory in relation to the virtual element;

wherein the potential collision of the user of the augmented reality device with the real-world element is determined based on weighting individual ones of the velocity criterion, the proximity criterion, and the orientation criterion.

14. A computer program product comprising a non-transitory computer readable storage device having a computer readable program stored thereon, wherein the computer readable program when executed on a computer causes the computer to:

render, with a processor at an augmented reality device, virtual elements in an augmented reality experience;

identify, with the processor, individual ones of the virtual elements that are tied to individual real-world elements because they are overlaying the individual real-world elements to augment appearance of the individual real-world elements in views of a real-world environment, and individual ones of the virtual elements that are not tied to the individual real-world elements because they are not overlaying the individual real-world elements to augment the appearance of the individual real-world elements in the views of the real-world environment;

in response to identifying that a virtual element is tied to a real-world element because it is overlaying the real-world element to augment the appearance of the real-world element:

determine, with the processor, a potential collision of a user of the augmented reality device with the real-world element based on determining that an augmented reality device accessory meets one or more mobility criteria with respect to the virtual element; and generate a cue in response to the potential collision by emitting, at the augmented reality device, one or more visual indicia that overlay the virtual element based on the one or more mobility criteria being met; and in response to identifying that a second virtual element is not tied to a second real-world element because it is not overlaying a second real-world element to augment the appearance of the second real-world element, render, with the processor, the second virtual element devoid of the one or more visual indicia.

15. The computer program product of claim 14, wherein the augmented reality device is a head-mounted display or a smartphone.

16. The computer program product of claim 14, wherein the augmented reality device comprises one or more light emitting diodes that perform the emission of the one or more visual indicia.

17. The computer program product of claim 14, wherein the augmented reality device comprises one or more projectors that perform the emission of the one or more visual indicia.

18. The computer program product of claim 14, wherein the one or more mobility criteria comprise velocity of the augmented reality device accessory toward the virtual element, such that the potential collision of the user of the augmented reality device with the real-world element is determined based on the velocity of the augmented reality device accessory toward the virtual element meeting or exceeding a velocity threshold.

19. The computer program product of claim 14, wherein the computer is further caused to perform emission based upon an additional mobility criterion being met, the additional mobility criterion being the augmented reality device accessory being at a position within a predetermined proximity threshold with respect to the virtual element.

20. The computer program product of claim 14, wherein the augmented reality device accessory is a hand controller.

21. A system comprising:

an augmented reality device accessory that interacts with virtual elements in an augmented reality experience; and an augmented reality device configured to:

render the virtual elements in the augmented reality experience;

identify individual ones of the virtual elements that are tied to individual real-world elements because they are overlaying individual real-world elements to augment appearance of the individual real-world elements in views of a real-world environment, and individual ones of the virtual elements that are not tied to the individual real-world elements because they are not overlaying the individual real-world elements to augment the appearance of the individual real-world elements in the views of the real-world environment;

in response to identifying that a virtual element is tied to a real-world element because it is overlaying the real-world element to augment the appearance of the real-world element:

determine a potential collision of a user of the augmented reality device with the real-world element based on determining that the augmented reality device accessory meets one or more mobility criteria with respect to the virtual element; and generate a cue in response to determining the potential collision by adjusting a rendering of the virtual element to increase visibility of the real-world element based on the one or more mobility criteria being met; and in response to identifying that a second virtual element is not tied to a second real-world element because it is not overlaying a second real-world element to augment the appearance of the second real-world element, render the second virtual element without adjusting the rendering of the second virtual element to increase visibility of the second real-world element.

* * * * *